United States Patent [19]
Lehto

[11] Patent Number: 5,980,197
[45] Date of Patent: Nov. 9, 1999

[54] METHOD FOR LAYING SPACING RIBS BETWEEN PRELAMINATED GLASS PANELS

[75] Inventor: Esko Lehto, Kangasala, Finland

[73] Assignee: Tamglass Ltd., Tampere, Finland

[21] Appl. No.: 09/063,376

[22] Filed: Apr. 21, 1998

[30] Foreign Application Priority Data

Apr. 21, 1997 [FI] Finland ..................................... 971695

[51] Int. Cl.⁶ ................................................. B65G 57/16
[52] U.S. Cl. ................... 414/801; 414/789.5; 414/798.5
[58] Field of Search ............................... 414/737, 789.5, 414/801, 802, 798.2, 798.5

[56] References Cited

U.S. PATENT DOCUMENTS

| | | | |
|---|---|---|---|
| 4,735,539 | 4/1988 | Häkkinen et al. ................... | 414/737 X |
| 4,863,340 | 9/1989 | Masunaga et al. ................... | 414/789.5 |
| 5,256,030 | 10/1993 | Tanaka et al. ..................... | 414/789.5 X |
| 5,632,595 | 5/1997 | Mori et al. .............................. | 414/795.6 |

FOREIGN PATENT DOCUMENTS

| | | |
|---|---|---|
| 0 314 632 | 5/1989 | European Pat. Off. . |
| 0 519 447 | 12/1992 | European Pat. Off. . |
| 26 09 028 | 9/1977 | Germany . |
| 2-88188 | 3/1990 | Japan ..................................... 414/737 |
| 2-225225 | 9/1990 | Japan ..................................... 414/737 |
| 4-159921 | 6/1992 | Japan ..................................... 414/737 |
| 7-266275 | 10/1995 | Japan . |
| 1 190 085 | 4/1970 | United Kingdom . |

*Primary Examiner*—Janice L. Krizek
*Attorney, Agent, or Firm*—Burns, Doane, Swecker & Mathis, L.L.P.

[57] ABSTRACT

The invention relates to a method for laying spacing ribs between prelaminated glass panels. Suction pads (10) grabbing a glass (13) and grippers (9) picking up ribs (12) are manipulated together with a common transfer device (1). In a first sequence, the transfer device (1) is brought alongside a rib magazine (14) and the ribs (12) are picked up with the grippers (9), in a second sequence the transfer device (1) is carried along with the ribs to a position above the glass (13) on a conveyor (15) and the suction pads (10) are used to grab the glass (13), and in a third sequence, the glass (13) is carried by means of the transfer device (1) along with the ribs (12) onto an unloading block (18, 19).

12 Claims, 2 Drawing Sheets

METHOD FOR LAYING SPACING RIBS BETWEEN PRELAMINATED GLASS PANELS

At the discharge end of a glass-panel prelaminating machine, the prelaminated glass panels are loaded on an intermediate storage block prior to placing the same in an autoclave. It is necessary to lay spacing ribs between the glass panels for keeping the glass panels spaced, i.e. by an air gap, from each other. One problem in terms of automating the laminating line has been the laying of intervening or spacing ribs. Thus far, it has not been possible to develop automatics for this purpose but, instead, it has been necessary to lay down the spacing ribs manually.

An object of the invention is to provide a method, whereby the spacing ribs can be laid automatically between prelaminated glass panels or sheets while the glass panels emerging from a prelaminating line are loaded on an intermediate storage block.

This object is achieved with a method as set forth in the appended claims. The invention will now be described in more detail with reference made to the accompanying drawings, in which FIG. 1 is a side view of an apparatus for implementing a method of the invention in its various operating sequences I, II, III;

Figure 1:
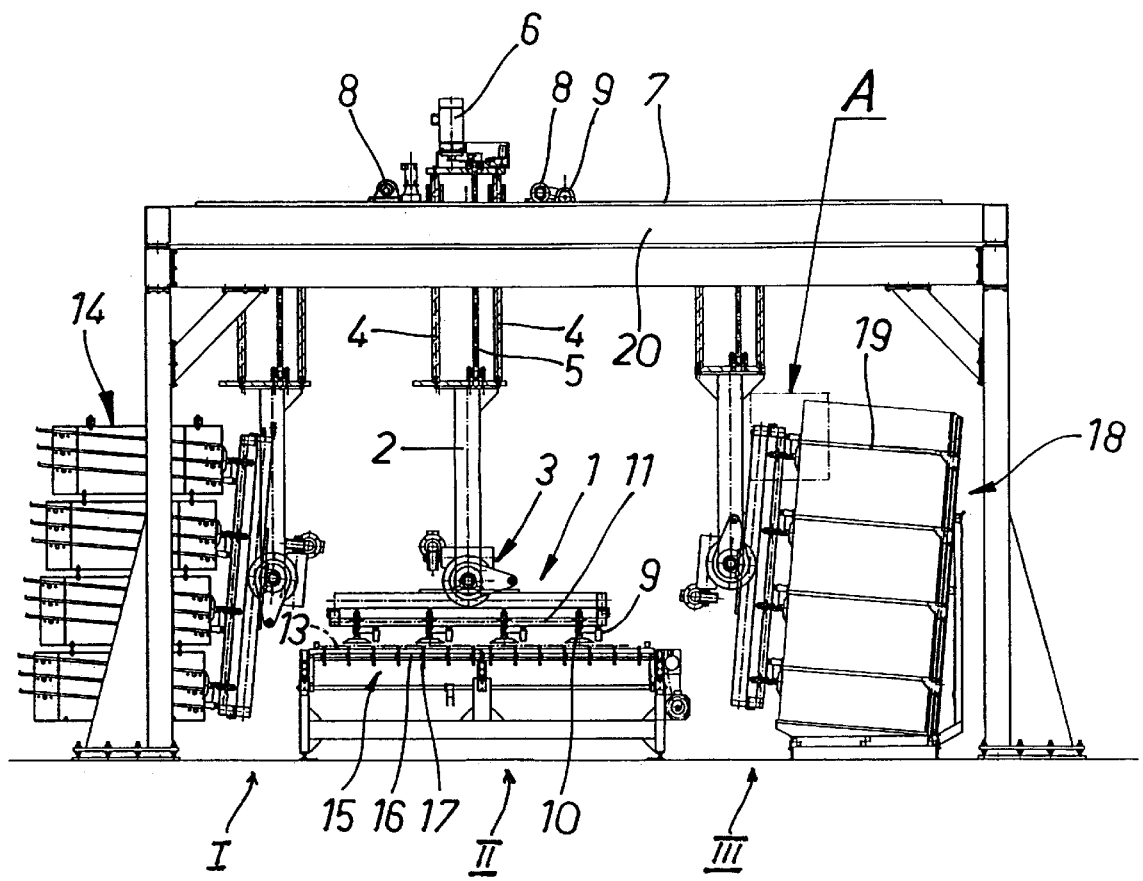
Figure 2:
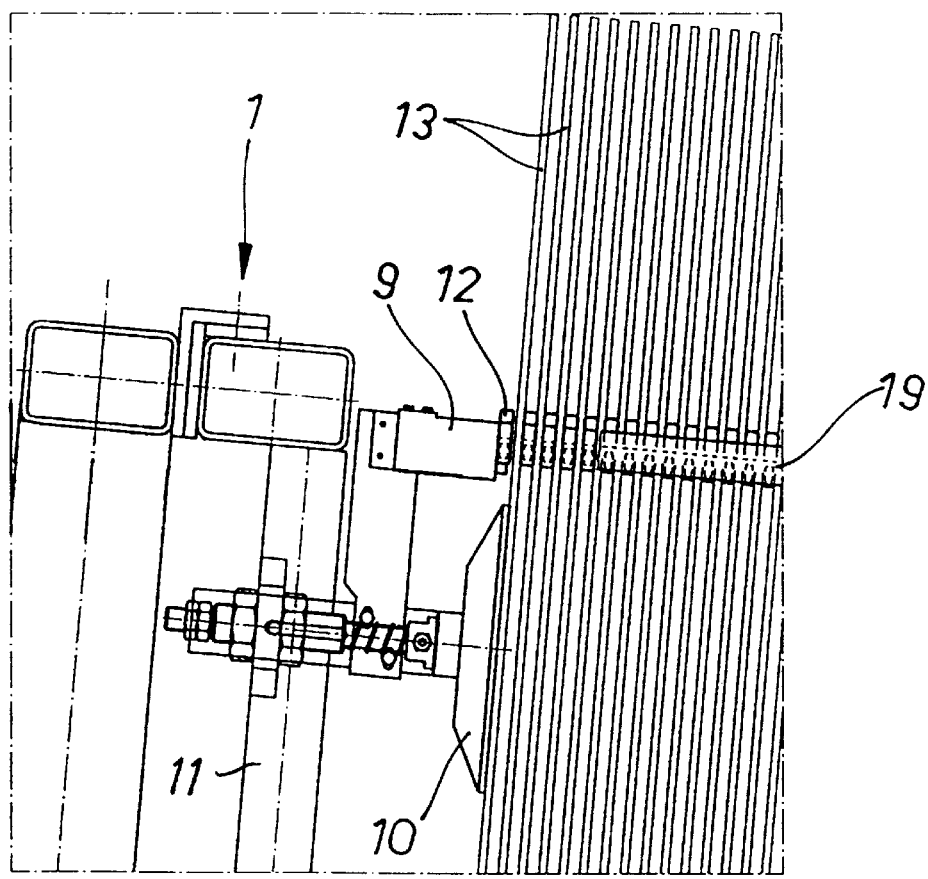
FIG. 2 shows an enlargement of FIG. 1 at a detail A.

Prelaminated glass panels 13 are carried by means of a conveyor 15 from a prelaminating machine (not shown) to lie alongside a rib magazine 14. The conveyor 15 may consist of e.g. rotating shafts 16 and discs 17 mounted thereon.

Above the conveyor 15 is a transfer device 1, which is suspended by means of a pivoting gear 3 on a vertical shaft 2. The vertical shaft 2 is in turn suspended on a horizontal main beam 20 by means of vertical guides 4 as well as a transfer screw 5 that can be rotated by means of a power unit 6 for lifting and lowering the transfer device 1. On top of the beam 20 is a rail 7 for carrying the suspension mechanism of the transfer device 1 therealong in a horizontal direction upon rollers 8 under the power of a motor 9. Thus, the transfer device 1 can be operated transversely relative to the advancing direction of the conveyor 15 both in horizontal and vertical directions. In addition, the transfer device 1 can be shifted between vertical positions and a horizontal position. This shifting is effected by means of the pivoting gear 3 in such a manner that, when picking up the ribs contained in a rib magazine 14 (sequence I) and when releasing the same on an unloading block 18, 19 (sequence III), the transfer device 1 is in a substantially vertical position but between these sequences I and III said transfer device 1 has been pivoted about 180°. When grabbing the glass, the transfer device 1 is in a substantially horizontal position.

The transfer device 1 includes a plurality of spaced-apart, parallel tubes, rods, or bars 11. In the depicted case, each rod or bar 11 is fitted with grippers 9, the number of which is four and which can be used for grabbing the ribs. For this purpose, the grippers 9 are provided with either suction pads or pick-up fingers for pressing a rib therebetween. Alongside the grippers 9 are suction pads 10 for grabbing the glass. In a method of the invention, the suction pads 10 and the grippers 9 are manipulated together with a common transfer device 1.

In a first sequence of the method, the transfer device 1 is brought alongside the rib magazine 14 and four ribs are picked up with the grippers 9. In a second sequence, the transfer device 1 is carried along with the ribs to a position above the glass 13 on the conveyor 15 and the suction pads 10 are used to grab the glass 13. In a third sequence, the glass 13 is carried by means of the transfer device 1 along with ribs 12 onto the unloading block 18, 19 so as to lay the ribs on top of bars 19.

Figure 3:
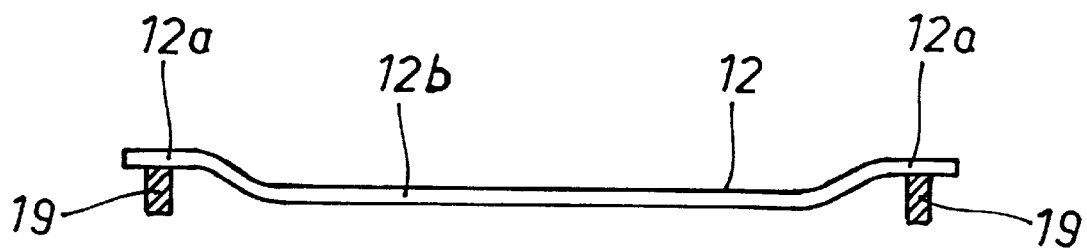
FIG. 3 shows a preferred embodiment for a spacing rib useful in the method.

In the method, it is preferable to use the type of spacing ribs 12 (FIG. 3), having between its bearing ends 12a a middle rib section 12b which is offset from a straight line between the bearing ends 12a. Thus, the rib has its centre of gravity offset from the straight line between the bearing ends 12a and the rib suspended by its bearing ends 12a on the bars 19 always stays in such a position that the mid-section 12b is lower down than the bearing ends 12a. This offers the advantage that the ribs can be made narrow to keep the same always on the narrow side thereof for a high degree of loading and an efficient use of space on the unloading block 18 and in further processing. In the rib magazine 14, on the other hand, the ribs may be supported by the mid-sections 12b thereof, whereby the ends 12a are lower. When picked up in this position, the ribs 12 turn right side up before reaching the block 18 as the transfer device 1 pivots through 180°.

FIG. 1 illustrates the transfer device in all three sequences, i.e. the question is about a single transfer device which shifts between the depicted positions.

In a preferred case, the rib magazine 14 and the unloading block 19 are in alignment with each other on opposite sides of the conveyor 15. Naturally, it is also possible to adapt the transfer device 1 to travel lengthwise of the conveyor 15 (in the direction perpendicular to the plane of the drawing), whereby the rib magazine 14 and the unloading block 19 may be in positions offset relative to each other.

I claim:

1. A method for laying spacing ribs between prelaminated glass panels, comprising:

positioning a transfer device alongside a rib magazine that contains ribs, the transfer device including both grippers and suction pads;

picking up the ribs with the grippers;

moving the transfer device with the ribs supported by the grippers to a position above a glass panel on a conveyor;

grabbing the glass panel with the suction pads;

carrying the glass panel along with the ribs to an unloading block by way of the transfer device; and releasing the glass panel from the suction pads and the ribs from the grippers.

2. A method as set forth in claim 1, wherein when grabbing the glass panel, said transfer device is in a substantially horizontal position.

3. A spacing rib for use in a method as set forth in claim 1, the spacing rib comprising bearing ends and a section between the bearing ends of the spacing rib, at least a portion of the section of the spacing rib between the bearing ends being offset from a straight line between the bearing ends so that the spacing rib has a centre of gravity offset from said straight line.

4. A method as set forth in claim 1, wherein the transfer device is operated transversely relative to an advancing direction of the conveyor both in horizontal and vertical directions and, in addition, the transfer device is shifted between vertical positions and a horizontal position.

5. A method as set forth in claim 4, wherein when picking up the ribs and when releasing the ribs on the unloading block, the transfer device is in a substantially vertical position, and including pivoting said transfer device about 180° between a position in which the ribs are picked-up and a position in which the ribs are released.

6. A method as set forth in claim 4, wherein when grabbing the glass panel, said transfer device is in a substantially horizontal position.

7. A method for laying spacing ribs between prelaminated glass panels, comprising:

picking up ribs from a rib magazine through use of grippers provided on a transfer device;

positioning the transfer device along with the ribs held by the grippers to a position adjacent a glass panel;

grabbing the glass panel with suction pads provided on said transfer device;

positioning said transfer device along with the ribs held by the grippers and the glass panel held by the suction pads to an unloading block; and releasing the glass panel from the suction pads and the ribs from the grippers.

8. A method as set forth in claim 7, wherein when grabbing the glass panel, said transfer device is in a substantially horizontal position.

9. A spacing rib for use in a method as set forth in claim 7, the spacing rib comprising bearing ends and a section between the bearing ends of the spacing rib, at least a portion of the section of the spacing rib between the bearing ends being offset from a straight line between the bearing ends so that the spacing rib has a centre of gravity offset from said straight line.

10. A method as set forth in claim 7, wherein the transfer device is operated transversely relative to an advancing direction of the glass panel, both in horizontal and vertical directions and, in addition, the transfer device is shifted between vertical positions and a horizontal position.

11. A method as set forth in claim 10, wherein when picking up the ribs and when releasing the ribs on the unloading block, the transfer device is in a substantially vertical position and including pivoting said transfer device about 180° between a position in which the ribs are picked-up and a position in which the ribs are released.

12. A method as set forth in claim 10, wherein when grabbing the glass panel, said transfer device is in a substantially horizontal position.

\* \* \* \* \*